Aug. 9, 1927.
L. S. LACHMAN
1,638,634
GIRDER
Original Filed Nov. 9, 1923
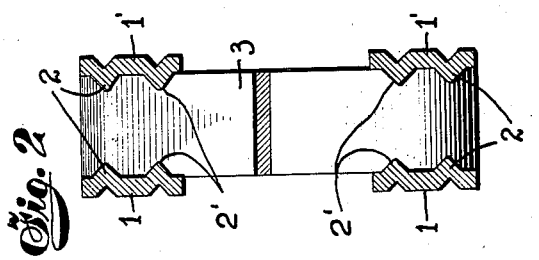
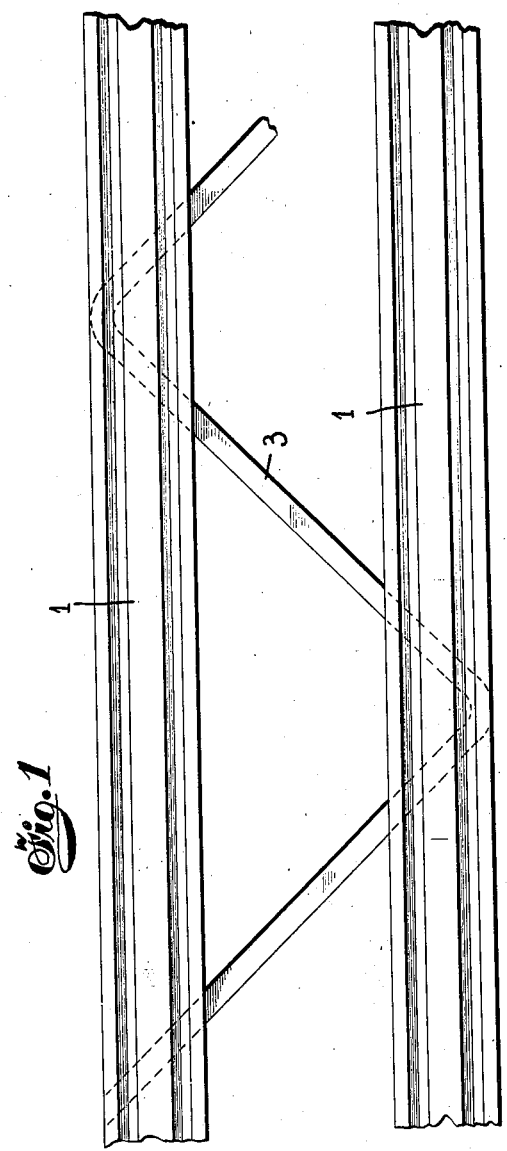
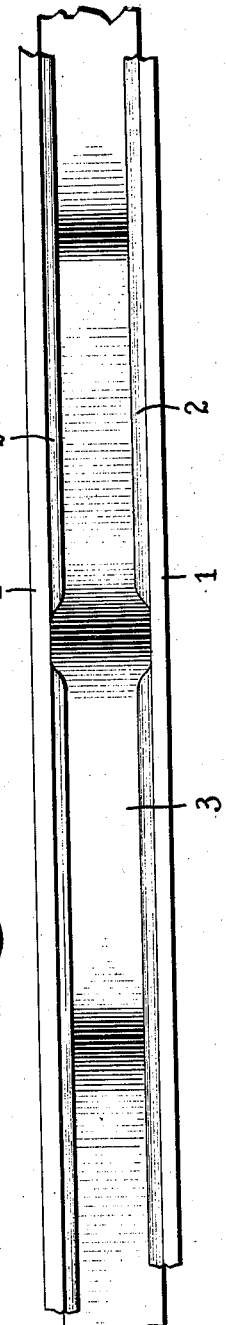
Inventor
Laurence S. Lachman.
By his Attorneys
Townsend & Necker Patented Aug. 9, 1927.

1,638,634

UNITED STATES PATENT OFFICE.

LAURENCE S. LACHMAN, OF NEW YORK, N. Y., ASSIGNOR TO UNIVERSAL ELECTRIC WELDING COMPANY, A CORPORATION OF NEW YORK.

GIRDER.

Application filed November 9, 1923, Serial No. 673,656. Renewed May 5, 1927.

My invention relates to girders, beams or the like comprising upper and lower or longitudinal members joined by braces or struts to form a skeleton girder in contradistinction to a plate girder.

The invention relates more particularly to a skeleton girder in which the braces or struts are electrically welded to the upper and lower members or longitudinals and its object is to produce a girder or the like which will have great resistance to force tending to deform it either in the plane of the girder or in the direction transverse thereto and that at the same time will be cheap to construct by reason of the small amount of material contained therein and the facility with which the parts may be joined by the electric welding method.

To these ends my invention consists in the special construction hereinafter described in connection with the accompanying drawings and then specified in the claims.

While the invention is described in connection with the production of a structure termed for convenience a girder, it will be understood that the purposes and advantages of the invention may be realized in any similar structure employed for any other purpose and that therefore the term girder is employed merely for convenience of description.

In the accompanying drawings:

Fig. 1 is a side elevation of a girder embodying my invention.

Fig. 2 is a vertical cross-section through Fig. 1 on the line 2—2.

Fig. 3 is a plan of the girder.

Each upper and lower member or longitudinal of the structure consists of a pair of bars 1 and 1'. These are arranged in parallel relation and in close proximity to one another and on edge or, in other words, the general plane of each bar is substantially parallel to the general plane of the girder. Each of the plates or bars forming a longitudinal is provided with an interiorly projecting longitudinal edge or projection to aid in the welding of the spacing plate or plates to said bars 1, 1' in position between them. Said edge or projection preferably consists of a rib 2 projecting from the surface of a flat bar or strip.

A strut or brace connecting the upper and lower members thus formed of a pair of bars on edge consists of a plate disposed in a plane transverse to the general plane of the structure and interposed between and spacing the bars apart and welded thereto on the edges of said plate. This plate, indicated at 3, is preferably constructed by bending said plate into the zig-zag shape to form diagonals, the bends of the zig-zag being located between the bars or plates 1, 1' in position flush or within the horizontal plane taking in the outer edges of the two bars 1, 1'. In the welding of the edges of the plate 3 to the inner face of the bars 1, 1' the longitudinal ridges or edges 2, 2' where engaged by the edge of the plate 3, afford limited areas of contact useful in producing the heated areas for welding when the parts are assembled in position between pressure and current supplying dies as well understood in the art of resistance and pressure welding. The pressure to which the parts are subjected results in partially forcing the ribs into the edge of the plate 3 and forms at the points of engagement a homogeneous welded joint. When the bars 1, 1' consist of flat ridged plates the pressure is preferably continued until the unwelded edges of the plate 3, located between the members 1 and 1' come into contact with the flat portion of the inner face of the bars 1, 1' so that by such engagement in conjunction with the welding on the ribs 2, the stiffness of the structure is largely enhanced.

It will be seen from the foregoing that great stiffness or resistance to compression load applied in the general plane of the girder or the like is secured by reason of the fact that the two plates 1, 1' are disposed on edge, and that great resistance to distortion forces or those tending to deform the girder in a direction transverse to its general plane is secured by reason of the fact that the plane of the plate 3 is transverse to the general plane of the girder and that resistance to such deforming action is further secured by the presence of the longitudinal inwardly extending edges or ribs 2 and by the fact that in the particular form of the invention shown, the plate 3 is securely anchored against the inner faces of said bars 1, 1'.

It will also be seen that in use as a girder the structure possesses the advantage that the faces thereof are free from objectionable projections and that by locating the bends flush with or below the general plane of the external edges of each pair of bars 1, 1', the edges of the girder will be free from projections or obstructions which is a further advantage in many conditions of use.

I do not limit myself to the use of the structure described as a girder, although for convenience of description the term girder is used in this specification and in the claims, inasmuch as said structure may be employed to advantage in other situations or for other uses without departing from the purposes and advantages of my invention.

What I claim as my invention is:—

1. An electrically welded skeleton girder, beam or the like the upper and lower members of which consist each of a pair of bars arranged on edge parallel and in close proximity to one another, the general plane of each being substantially parallel to the general plane of the girder and braces or struts consisting of plate members disposed in a plane transverse to the general plane of the structure, inclined in opposite directions and interposed between and spacing the pairs of bars apart, the two opposite edges of said braces or struts on their spacing portion being welded respectively to the inside of the pairs of bars forming said upper and lower members said edges contacting with the bars across the entire faces thereof.

2. An electrically welded skeleton girder, beam or the like the upper and lower members of which consist each of a pair of flat plates arranged on edge and provided with longitudinal ridges disposed intermediately of the sides thereof, and diagonals consisting of a plate bent into a zig-zag, the plane of said plate being transverse to the plane of the flat bars composing the upper and lower members and having the angles or bends of the zig-zag disposed between and spacing apart the members of the pair of plates forming the upper and lower members and being welded thereto by an electrical weld formed between the edges of the zig-zag plates and the ridges on the longitudinal members.

3. An electrically welded skeleton beam, girder or the like, the upper and lower members of which consists each of a pair of bars arranged in parallel relation and in close proximity to one another, the general plane of each bar being substantially parallel to the general plane of the girder and each said bar having interiorly projecting, longitudinal projections disposed intermediately of the width thereof and braces or struts consisting of a plate disposed in a plane transverse to the general plane of the structure and interposed between and spacing the pairs of bars apart, the two opposite edges of said braces or struts on their spacing portion being respectively welded to longitudinal edges or projections at the inside of the pairs of bars forming said upper and lower members.

4. An electrically welded girder comprising upper and lower pairs of bars disposed on edge and which are flat except for indented projecting portions, the projecting portions of the bars of each pair extending toward each other and diagonal bar members inclined in opposite directions, having their planes extending transversely of the girder, and disposed between the bars of each pair and electrically welded to the latter through the intermediary of the indented projecting portions.

5. An electrically welded skeleton girder comprising upper and lower pairs of bars and each bar being flat except for one or more longitudinally-extending indented ribs, the flat portions of the bars at each side of the girder being coplaner, and the ribs of the bars of each pair extending toward each other, and diagonal bar members inclined in opposite directions, having their planes extending transversely of the girder, and disposed between the bars of each pair and electrically welded to the latter through the intermediary of the projecting rib portions.

6. An electrically welded skeleton girder comprising upper and lower pairs of bars and each bar being flat except for one or more longitudinally-extending indented ribs, the flat portions of the bars at each side of the girder being coplaner, and the ribs of the bars of each pair extending toward each other, and a zigzag member having its apical portions disposed between the bars of said pairs with the legs of each apical portion intersected by the rib portions of the adjoining bars and being electrically welded to the latter through the intermediary of said rib portions.

7. An electrically welded skeleton girder comprising an upper pair of bars disposed on edge with their upper edges coplaner, a lower pair of bars disposed on edge with their lower edges coplaner, each of said bars consisting of a member which is flat except for indented welding projections disposed intermediately of its width and the projections of each pair of bars extending toward each other, and a zigzag member having its inclined portions disposed in planes transverse to the girder and each inclined portion having opposite edges welded to the bar projections, the apical portions of the zigzag member being included between the planes of said coplaner edges of the pairs of bars.

Signed at New York, in the county of New York, and State of New York, this 8th day of November, A. D. 1923.

LAURENCE S. LACHMAN.